United States Patent
Kamiya et al.

(10) Patent No.: US 7,936,439 B2
(45) Date of Patent: May 3, 2011

(54) METHOD AND APPARATUS FOR STACKING SHEETS, AND METHOD AND APPARATUS FOR MANUFACTURING LIQUID CRYSTAL DISPLAY PANEL

(75) Inventors: Hiroyuki Kamiya, Kanagawa-ken (JP); Shuhichi Odahara, Kanagawa-ken (JP); Kohichi Toriumi, Shiga-ken (JP); Toshiyuki Yokoue, Shiga-ken (JP)

(73) Assignee: Au Optronics Corporation, Hsin-Chu (TW)

( * ) Notice: Subject to any disclaimer, the term of this patent is extended or adjusted under 35 U.S.C. 154(b) by 1068 days.

(21) Appl. No.: 11/458,492

(22) Filed: Oct. 23, 2006

(65) Prior Publication Data

US 2007/0026589 A1 Feb. 1, 2007

Related U.S. Application Data

(62) Division of application No. 10/859,779, filed on Jun. 3, 2004, now Pat. No. 7,150,298.

(51) Int. Cl.
*G02F 1/13* (2006.01)
(52) U.S. Cl. ............ 349/187; 438/30; 438/457; 156/99; 156/103; 349/190
(58) Field of Classification Search .................. 349/187, 349/190; 438/30, 457; 156/99, 103
See application file for complete search history.

(56) References Cited

U.S. PATENT DOCUMENTS

| | | | |
|---|---|---|---|
| 3,810,730 A | | 5/1974 | Carlsson |
| 4,253,891 A | | 3/1981 | Brussel |
| 4,348,252 A | | 9/1982 | Knoop et al. |
| 5,823,736 A | * | 10/1998 | Matsumura .................... 414/609 |
| 6,093,577 A | * | 7/2000 | van der Groen et al. ....... 438/30 |
| 6,665,043 B1 | * | 12/2003 | Okuyama et al. ............. 349/187 |
| 6,892,769 B2 | | 5/2005 | Hong |

FOREIGN PATENT DOCUMENTS

| JP | 04 179919 | 6/1992 |
|---|---|---|
| JP | 2000 029051 | 1/2000 |

\* cited by examiner

*Primary Examiner* — Michael H Caley
(74) *Attorney, Agent, or Firm* — Thomas, Kayden, Horstemeyer & Risley, LLP

(57) ABSTRACT

A broad crystal display panel having a color filter substrate is supported by supporting nails and the middle portion of a supporting span is pressed by a loading bar. From this state, the supporting nails are removed to release the supporting, and subsequently the supporting nails are also removed to release the supporting the color filter substrate. While preventing the displacement between the color filter substrate and a TFT array substrate, the color filter substrate and the TFT array substrate can be stacked with a specified distance.

5 Claims, 12 Drawing Sheets

METHOD AND APPARATUS FOR STACKING SHEETS, AND METHOD AND APPARATUS FOR MANUFACTURING LIQUID CRYSTAL DISPLAY PANEL

CROSS-REFERENCE TO RELATED APPLICATION

This application is a Divisional of U.S. application Ser. No. 09/929,675 filed on Aug. 14, 2001, which is incorporated herein by reference.

BACKGROUND OF THE INVENTION

1. Field of the Invention

The present invention relates to a method and an apparatus for stacking sheets and, more particularly, to a method and an apparatus for stacking a pair of glass substrates constituting a liquid crystal display panel.

2. Discussion of Related Art

There has been a conspicuous rise in the popularity of a liquid crystal display device used as an image display device for a personal computer and various other monitors. In general, such a liquid crystal display device is constituted so as to make an image formed on a liquid crystal is surface visible by disposing a backlight as a sheet-like light source for lighting in the backside of a liquid crystal display panel and by lighting the entire liquid crystal surface having a specified width to uniform brightness. This liquid crystal display device includes a liquid crystal display panel having liquid crystal sealed in between a pair of glass substrates.

The liquid crystal display panel is manufactured mainly by a process called a vacuum injection method. According to the vacuum injection method, a pair of glass substrates having a predetermined distance therebetween are arranged oppositely to each other, a panel including a liquid crystal inlet is dipped in liquid crystal after the execution of degassing between the glass substrates under vacuum, then the atmospheric pressure is restored and, by using a pressure difference between the inside and the outside of the panel and capillarity, the liquid crystal is injected into the panel. The panel can be obtained by applying sealant around the pair of glass substrates in a picture-frame state, and then curing the sealant. A region surrounded with the sealant of the picture-frame state becomes an image display region, and the liquid crystal is injected through the liquid crystal inlet into this image display region. The liquid crystal inlet is sealed off after the liquid crystal is injected. For a sealant material, a thermosetting or ultraviolet curable resin is used, and the sealant is cured before injection of the liquid crystal.

A problem inherent in the vacuum injection method has been long time expended for injection of the liquid crystal. In particular, there has been a problem that a great deal of time required for injection when the size of the liquid crystal display panel becomes larger.

In addition to the above-described vacuum injection method, a liquid crystal sealing-in process called a dropping method is available. According to the dropping method, sealant is coated in a picture-frame state around one of the pair of glass substrates, the other glass substrate is stacked after liquid crystal is dropped on a region surrounded with the sealant, and then the sealant is cured. Compared with the vacuum injection method, this dropping method is advantageous in that time required for liquid crystal dropping is greatly shortened. Therefore, considering manufacturing costs, the dropping method is a good manufacturing method.

Regarding the stacking of the glass substrate after the dropping of liquid crystal, the dropping method has a method executed in the atmosphere, and a method executed in a vacuum device. The method of stacking the glass substrate in the atmosphere is advantageous in that manufacturing costs can be reduced by an amount equivalent to the nonuse of the vacuum device. However, bubbles tend to remain on a stacking surface during the stacking of the glass substrate in the atmosphere. These bubbles may lead to a display failure in the liquid crystal display device. Many suggestions have been presented to solve this problem of residual bubbles. For example, Japanese Patent Laid-Open No. Hei 4 (1992)-179919 discloses a stacking method of widely spreading liquid crystal on the full surface of the glass substrate while narrowing an angle between the pair of glass substrates, liquid crystal having been coated on the corner of one glass substrate at the point of intersection where the pair of glass substrates are arranged to face each other in a surface direction in a wedge shape. Also, Japanese Patent Laid-Open No. Hei 4(1992)-179919 or Japanese Patent Laid-Open No. 2000-29051 discloses a method of widely spreading liquid crystal on a full surface while returning the glass substrate to its original planar state after the pair of glass substrates are placed to face each other, and liquid crystal is interposed while at least one glass substrate is bent in a projecting shape.

The above-described methods reduce residual bubbles. However, as long as stacking is carried out in the atmosphere, bubbles always remain to a slight extent. Especially when higher image quality is required, these methods cannot provide sufficient countermeasures.

It is therefore considered preferable to execute the stacking of the glass substrate in vacuum even in the dropping method. However, for stacking the glass substrate in vacuum, there is a problem regarding how to hold the glass substrate in vacuum. In other words, to stack the pair of glass substrates, at least one glass substrate must be aligned with the other glass substrate while it is being held. But no proper means for holding the glass substrate has been discovered yet.

As one of the most general glass substrate holding methods in the atmosphere, a vacuum chucking or holding method is available. To begin with, however, the vacuum chucking method cannot be used in vacuum, where provides no differential pressures. An electrostatic chucking or holding method using static electricity enables to hold the glass substrate in vacuum. However, in the electrostatic chucking method, it takes a long time until securely holding. In addition, an electric circuit is provided on the glass substrate of the liquid crystal display device, and there is a danger that the electrostatic chucking may cause electrostatic destruction in the circuit.

If a mechanical holding method is used, the glass substrate can be held in vacuum, holding time can be short, and the electrostatic destruction of the circuit can be prevented.

The glass substrate used for the liquid crystal display device is thin, having a thickness set equal to about 0.7 mm, and a distance between the pair of glass substrates is very small, that is, 10 micrometers or less. Further, the pair of glass substrates must be stacked in the state of highly accurate alignment. Accordingly, even if the mechanical holding method is employed, a method and an apparatus for stacking should be selected with consideration given to the above point.

The present invention was made with the foregoing problems in mind, and the object of the invention is to provide an apparatus and a method for stacking sheets accurately even in vacuum. Another object of the invention is to provide a method and an apparatus for manufacturing a liquid crystal display panel by using such stacking apparatus and method.

SUMMARY OF THE INVENTION

As one of the most general methods of mechanically holding the glass substrate, a method is available for mechanically supporting the peripheral edge of the glass substrate from a lower side. As described above, the glass substrate used for the liquid crystal display device is thin, having a thickness of about 0.7 mm. Thus, if the glass substrate is supported by its peripheral edge, then bending may occur because of the own-weight of the glass substrate.

When one of the paired glass substrates is stacked on the other with edges aligned while the peripheral edge thereof is supported by supporting means, the supporting means is held between the paired glass substrates. In the liquid crystal display device, since a distance between the paired glass substrates is small, that is, several micrometers, in order to stack one of the glass substrates on the other with edges aligned while supporting the peripheral edge thereof by the supporting means, a thickness of the supporting means must be set equal to several micrometers or less. However, it is difficult to support the glass substrate by the supporting means having a thickness of only about several micrometers.

The present invention takes advantage of the bending of the glass substrate. The bending amount of the bent glass substrate is maximum in its middle portion. In other words, by setting the middle portion as a reference for regulating a distance required by the liquid crystal display panel, the peripheral edge of the glass substrate has a distance larger than this distance. Accordingly, the thickness of the supporting means can be set larger than the distance, realizing the employment of mechanical supporting means. In this case, the position of supporting the glass substrate must be set so as to increase the is amount of bending. Generally, the glass substrate used for the liquid crystal display device is rectangular. The rectangular shape has two opposing long sides and two opposing short sides. To support the glass substrate in such a way as to increase the amount of bending, the opposing short sides only need to be held. Such a holding causes bending along the longitudinal direction of the glass substrate. Otherwise, if the glass substrate is held by opposing long sides, it can make a larger distance between alignment marks on the substrate so as to achieve higher alignment accuracy.

In the liquid crystal display device, the paired glass substrates must be stacked with high accuracy. For this purpose, alignment marks are formed on the pair of glass substrates, and the glass substrates are aligned with each other while observing these alignment marks by a microscope. To execute such an alignment, the paired glass substrates must be brought close to each other by a distance (focal depth) for simultaneously focusing the alignment marks of the pair of glass substrates. Assuming that one of the glass substrates is bent, a distance between the lowest point of the glass substrate by the bending and the other glass substrate is set to be a distance within the focal depth, and an alignment mark is formed in this region. However, it is not easy to control the distance between the lowest point of the glass substrate by the bending and the other glass substrate to a distance within the focal depth. Especially when the size of the glass substrate changes to vary its bending amount, control thereof becomes much more difficult. Conversely, if the amount of bending could be kept constant irrespective of the glass substrate size, then the distance between the lowest point of the glass substrate by the bending and the other glass substrate can be easily controlled to a distance within the focal depth.

After the end of the alignment using the alignment marks, the supported state of the bent glass substrate must be released. Since the alignment has been carried out, any displacement of the each substrates after the releasing of the supported state must be avoided. When the supporting state of the supporting means supporting the peripheral edge of the glass substrate is suddenly released, almost no macroscopic displacement occurs in the position of the glass substrate because of the law of inertia. However, in the liquid crystal display device, since even microscopic fluctuation becomes a problem, with only the sudden releasing of such a supporting state, unnecessary displacement may occur in the liquid crystal display panel. To prevent such a displacement, the horizontal movement of the glass substrate supported by the supporting means must be restricted. By applying a perpendicular load on the glass substrate, the horizontal or in-plane movement of the glass substrate can be restricted. Especially, the application of this load on a position corresponding to the lowest point of the glass substrate by the bending is preferable for the prevention of the displacement.

By the way, the displacement between the laminated substrates should be less than a few micrometers, generally less than 3 micrometers, and preferably less than 1 micrometer. In order to achieve the short displacement, realignment or fine alignment may be executed after releasing the supporting state. In such case, it is preferred to execute the fine alignment in vacuum. Then, the present invention provides the method of fine alignment which can be easily performed in vacuum.

Usually, spacer is disposed on at least one substrate to control the cell gap between two substrates appropriately. As the spacer, beads can be disposed or columns (referred as post spacers) can be formed on the substrate. At the case of using the post spacers, if the tips of the columns come into contact with the surface of the substrate facing oppositely, then it generates very high friction between them resulting very large reaction between the substrates. Thus, it is necessary to use larger force to support the substrate than the reaction for executing the fine alignment of the substrates tightly stuck by the very high friction. From the result of measuring the reaction between the 13.3 inches substrates having post spacer, in the atmosphere, it reaches 80-100 kgf. The larger sizes of the substrate and the larger number of the post spacers, the larger reaction is occurred between the substrates, thus the larger supporting force is necessary to perform the fine alignment. It is estimated that the reaction may reach to a few thousands kgfs if a plural of liquid crystal panels is built into the one pair of the substrates larger than 1 square meter each. In such a case of the large force which is loaded on a glass holding apparatus, the rigidity is required to prevent the glass holding apparatus from distortion beyond the tolerance. More specifically, in order to achieve the accuracy of alignment of 3 micrometers, the tolerance of the distortion should be totally 1 micrometer or less in the whole glass holding apparatus. Such an apparatus having the high rigidity is impractical from not only the size but also the cost point of view. And, if the substrate is held by such large force with vacuum chucking, the force directing to tear away the substrates is generated, and thus, it causes that the sealant is broken up to allow the air bubble catch into the cell and/or the glass substrate is broken down.

On the other hand, the inventor found that the fine alignment could be practiced by using a film having high coefficient of static friction. In the method of fine alignment of the subject invention, the film having high coefficient of static friction, such as silicone rubber sheet, is contacted to the upper surface of the upper substrate of the laminated substrates, and then the upper substrate can be moved horizontally by using the friction between the film and the surface of the substrate caused by applying the normal force to the interface between the film and the surface of the substrate. In this situation, the force loaded to the substrates is direct to press the substrates together, rather than to tear away them seen in the vacuum chucking. And, by using the film having high coefficient of static friction, only small force is required to hold and move the substrate, and then, not so high rigidity is required to the glass holding apparatus. It means there is very few risks to break up the sealant or the glass substrate. Particularly, if the film having the coefficient of the friction larger than 1.5, more preferably, larger than 2.0, is used, the normal force of 50-60 kgfs is necessary to cause the friction between the film and the surface of the substrate being larger than the reaction of 100 kgfs. Therefore, it is easy to realize the apparatus and method of the fine alignment.

The inventor also found that the upper substrate is floating on the liquid crystal dropped thereon without contacting the tip of the post spacers soon after the releasing the supporting of the substrate held by mechanical chucking, by the detailed investigation of the process to fill the liquid crystal into the substrates by dropping method. Such the floating situation, the reaction is very small because it depends only on the friction between the liquid crystal and the substrate but not on the large friction between the tip of the post spacers and the substrate, and as the result, it is only a few kgfs for the 13.3 inches substrates. And, after that, it takes a few 100 seconds to touch the tips of the post spacers with the upper substrate in the vacuum, which is sufficiently enough to complete the fine alignment. However, it takes only a few 10 seconds to touch them in the atmosphere, which is not enough to do the fine alignment. Therefore, it is preferred to execute the fine alignment in the vacuum with using the film having high coefficient of friction during a small reaction is existed between the substrates, which is in the floating state of the upper substrate on the liquid crystal.

The present invention was made based on the foregoing findings, and provides a method for stacking a first rectangular sheet and a second rectangular sheet. This method comprises the steps of: arranging the second sheet bent downward in a projecting shape by supporting two opposing sides oppositely to the first sheet; bringing the first sheet and the second sheet close to each other to have a predetermined distance; applying a perpendicular load to the second sheet; and stacking the first sheet and the second sheet by releasing the supporting of the two sides while the perpendicular load is in an applied state.

In the sheet stacking method of the present invention, the perpendicular load is preferably applied to the middle portion of a supporting span in the second sheet. This is advantageous in that since a balance is set with the load applied on the second sheet by supporting, the displacement or shifting of the second sheet can be prevented when the supporting is released.

Furthermore, regarding the releasing of the supporting of the two opposing sides, the simultaneous supporting releasing thereof is preferable for preventing the displacement of the second sheet.

Still furthermore, in the sheet stacking method of the present invention, controlling of the bending amount of the second sheet to a specified amount is preferable for the control of a distance between the first sheet and the second sheet.

The present invention provides a stacking apparatus for executing the foregoing sheet stacking method. Specifically, the sheet stacking apparatus of the present invention is designed for stacking a first rectangular sheet and a second rectangular sheet, and comprises: a stage having a mounting surface for flatly mounting the first sheet; first supporting means adapted to support each of two opposing sides of the second sheet and movable backward and forward in a direction parallel to the mounting surface; and a loading member for pressing the second sheet supported by the first supporting means in a direction orthogonal to the mounting surface.

In the sheet stacking apparatus of the present invention, distance adjusting means is preferably comprised to adjust a distance between the first sheet mounted on the stage and the second sheet supported by the first supporting means.

According to the present invention, the sheet stacking apparatus further comprises second supporting means adapted to support each of two sides orthogonal to the two opposing sides of the second sheet and movable backward and forward in a direction parallel to the mounting surface. This second supporting means is capable of controlling the bending amount of the second sheet by supporting the second sheet in a position lower than the first supporting means by a specified distance.

Further, in the stacking apparatus of the present invention, the first supporting means and the second supporting means are preferably movable backward and forward independently of each other. After supporting by the second supporting means is released, supporting by the first supporting means can be released. Alternatively, a reverse operation like that can be performed.

The present invention can be applied to a manufacturing method of a liquid crystal display panel. Specifically, the method of the present invention is adapted to manufacture a liquid crystal display panel having a pair of glass substrates disposed oppositely to each other with a predetermined distance and secured by sealant formed along the peripheral portion thereof, and liquid crystal sealed in a region inside the sealant between the pair of glass substrates. The manufacturing method comprises the steps of: (a) flatly holding one of the pair of substrates; (b) dropping liquid crystal onto the one substrate; (c) supporting the other of said pair of substrates so as to be bent by supporting two opposing sides thereof, and a bending amount is controlled to be a specified value; (d) bringing the one substrate and the other substrate close to each other to reach a predetermined distance; (e) applying a load in the bending direction of the other substrate with respect to a position having maximum bending of the other substrate and/or a vicinity of the same; and (f) releasing the supporting the other substrate after the application of the load.

In the manufacturing method of the liquid crystal display panel of the present invention, the steps (d), (e) and (f) are preferably carried out in vacuum for the purpose of preventing bubbles from remaining in the liquid crystal display panel.

In addition, in the manufacturing method of the liquid crystal display panel of the present invention, the step (e) is preferably carried out after the alignment of the pair of glass substrates with each other. Of course, the alignment can be executed after executing the step (e).

Specifically, it is preferable for the prevention of the displacement that alignment is carried out before and/or after the step (e) of applying a load in the bending direction of the other glass substrate with respect to the position having maximum bending of the other glass substrate and/or the vicinity of the same, and then the step (f) of releasing the supported state of the other glass substrate is carried out after the application of the load.

Further, if necessary, the fine alignment can be executed by applying a normal force to a film having high coefficient of static friction. It is preferred to execute the fine alignment in vacuum, soon after releasing the supported state.

The present invention provides a manufacturing apparatus for realizing the foregoing manufacturing method of the liquid crystal display panel. Specifically, the apparatus of the present invention is adapted to manufacture a liquid crystal display panel having first and second substrates arranged oppositely to each other with a predetermined distance and secured by sealant formed along the peripheral portion thereof in a picture-frame, and liquid crystal sealed in a region inside the sealant between the first and second substrates. The manufacturing apparatus comprises: sealant applying means for applying sealant on the first substrate in a picture-frame; a dispenser for dropping liquid crystal onto the first substrate applied with the sealant; stacking means for stacking the first substrate having the liquid crystal dropped thereon and the second substrate; a vacuum chamber for performing the stacking in vacuum; and sealant curing means for curing the sealant on the stacked first and second substrates. The stacking means includes: a stage having a mounting surface for flatly holding the first substrate; first supporting means adapted to support each of two opposing sides of the second substrate and movable backward and forward in a direction parallel to the mounting surface; loading member for pressing the second substrate supported by the first supporting means in a direction orthogonal to the mounting surface; and distance adjusting means, for adjusting a distance between the first substrate mounted on the stage and the second substrate supported by the first supporting means.

Also, the manufacturing apparatus of the liquid crystal display panel of the subject invention comprises a fine alignment device. The fine alignment device comprises a film having high coefficient of static friction disposed directly on the surface of at least one substrate of the pair of substrates, and a loading plate for loading a normal force to the film.

BRIEF DESCRIPTION OF THE DRAWINGS

FIG. 9 is a plan view showing positions of a loading bar 8 and an alignment mark AM with respect to the color filter substrate 43a.

DETAILED DESCRIPTION OF PREFERRED EMBODIMENTS

The preferred embodiments of the present invention will be described with reference to the accompanying drawings.

Figure 1:
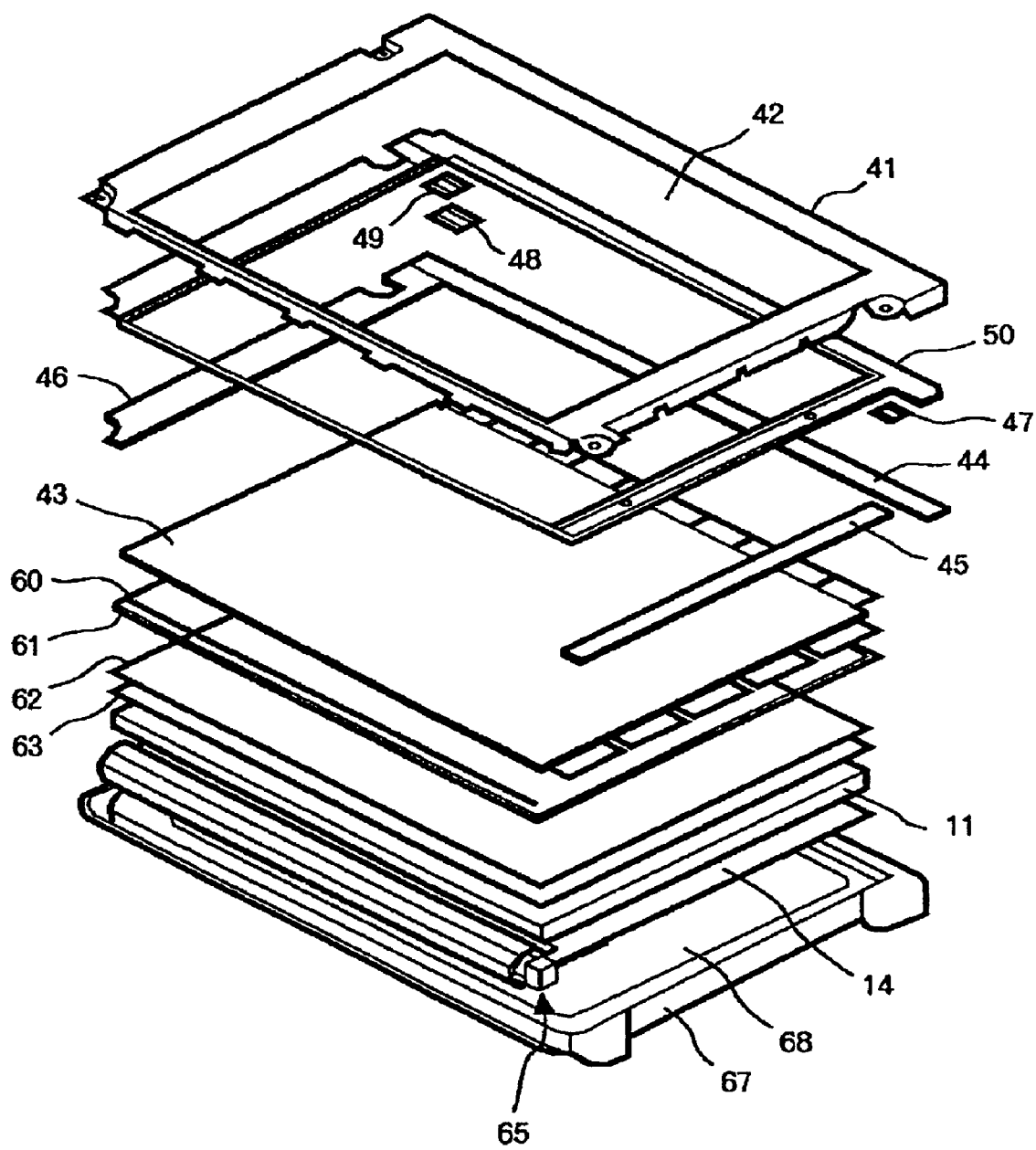
FIG. 1 is an exploded perspective view of a liquid crystal display device.

FIG. 1 is an exploded perspective view showing a color TFT (Thin Film Transistor) liquid crystal display device as one of the exemplary application of the present invention.

In FIG. 1, a reference numeral 41 denotes a metallic shield case for forming an upper frame, forming a display window 42 to define the effective screen of a liquid crystal display module. A reference numeral 43 denotes a liquid crystal display panel, which includes a TFT having source and drain electrodes, a gate electrode, and an amorphous silicon layer or the like, a color filter, and so on, stacked between a pair of glass substrates, and also liquid crystal sealed therebetween. According to this embodiment, a process is provided to have a specific feature for forming this liquid crystal display panel 43 by stacking.

On the upper portion of the liquid crystal display panel 43, a drain circuit board 44, a gate circuit board 45 and an interface circuit board 46 are formed, and also joiners 47, 48 and 49 are provided to interconnect these circuit boards. The circuit boards 44, 45 and 46 are fixed to the shield case 41 via an insulating sheet 50.

On the other hand, under the liquid crystal display panel 43, a light shielding spacer 61 is provided by interpolating a rubber cushion 60, and a diffusion plate 62 and a prism sheet 63 are also provided. The diffusion plate 62 has a function of diffusing light from a later-described light guide plate 11 to obtain a uniform plane light. The prism sheet 63 is used to increase the luminance of a front direction. Moreover, the light guide plate 11 is located under the prism sheet 63, and includes a fluorescent lamp unit 65 provided in its one side. Such fluorescent lamp units 65 may be provided in two sides. And, a reflection plate 14 is provided under the light guide plate 11, which is adapted to reflect a light made incident from the fluorescent lamp unit 65 on the light guide plate 11 toward the liquid crystal display panel 43. And also, a lower case portion 67 having an opening 68 is provided under the reflection plate 14.

One of the paired glass substrates constituting the liquid crystal display panel 43 is a color filter substrate, and the other a TFT array substrate. For such a glass substrate, for example, highly flat nonalkaline glass having a thickness less than 1 mm, for instance of 0.7 mm, is used.

The color filter substrate includes a color filter made of a polymer film containing dye or pigment having three primary colors of red (R), green (G) and blue (B), a black matrix arranged as a light shielding film between the pixels of the color filter, a protective film made of a polymer film for protecting the color filter and the black matrix, a common electrode made of a transparent conductive thin film (for example, ITO: Indium Tin Oxide or the like), and an alignment film made of a polyimide thin film for aligning liquid crystal, which are stacked in sequence on the glass substrate.

The TFT array substrate includes a displaying electrode made of a transparent conductive thin film (for example, ITO: Indium Tin Oxide or the like) as a pixel for displaying, a TFT as a switching device for driving liquid crystal, a storage capacity as a signal holding capacity for an active matrix operation, which are formed on the glass substrate.

The peripheral edge portions of the color filter substrate and the TFT array substrate are adhered to each other by sealant as adhesive. A region surrounded with the sealant becomes an image displaying area.

In the image displaying area, a spacer is arranged to control a distance between the color filter substrate and the TFT array substrate, in other words, to control the thickness of a liquid crystal layer (referred to as a cell gap). As the spacer, silica ($SiO_2$) or polymer particles are used. Since the cell gap of the color TFT liquid crystal display device is set equal to 5 to 6 micrometers, the spacer having a diameter of 5 to 6 micrometers is used. Recently, a column to function as a spacer (referred to as a post-spacer) has been formed in the color filter substrate or the TFT array substrate by a thin film process.

Now, the manufacturing process of the above-described liquid crystal display panel 43 will be described in outline by referring to FIGS. 2 to 4. The liquid crystal display panel 43 of the embodiment is manufactured by a dropping or dispensing method.

Figure 2:
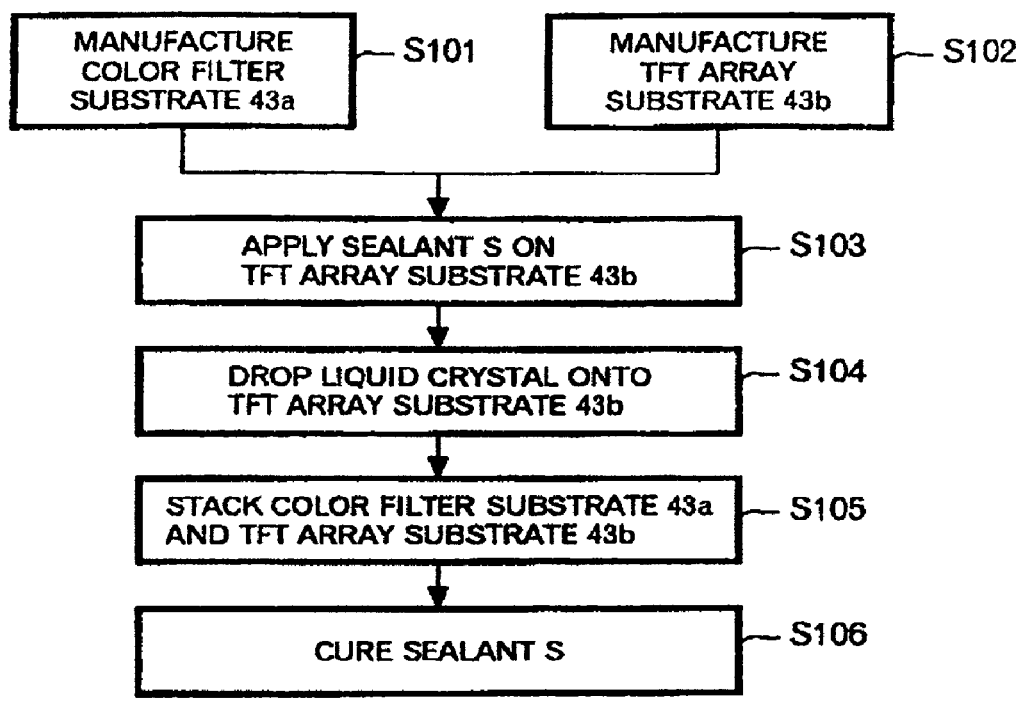
FIG. 2 is a flowchart schematically showing a manufacturing process of a liquid crystal display panel 43 according to an embodiment of the invention.
Figure 4:
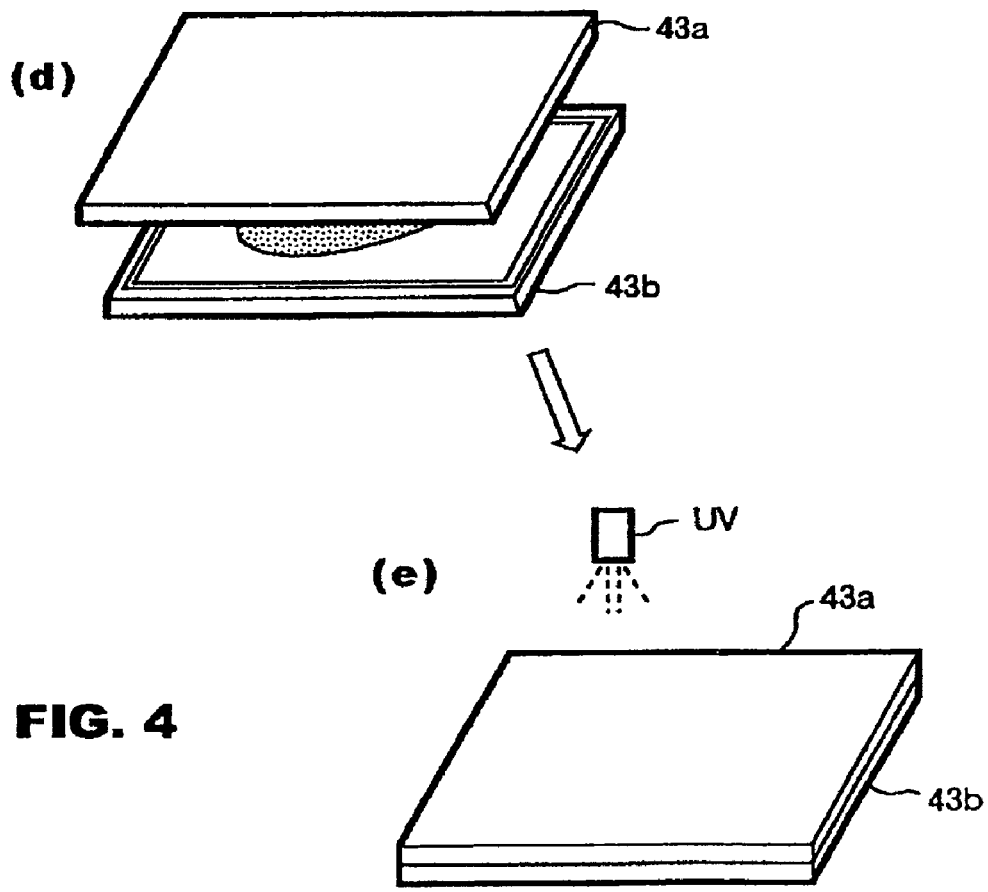
FIG. 4 is a view schematically showing the manufacturing process of the liquid crystal display panel 43 of the embodiment.
Figure 3:
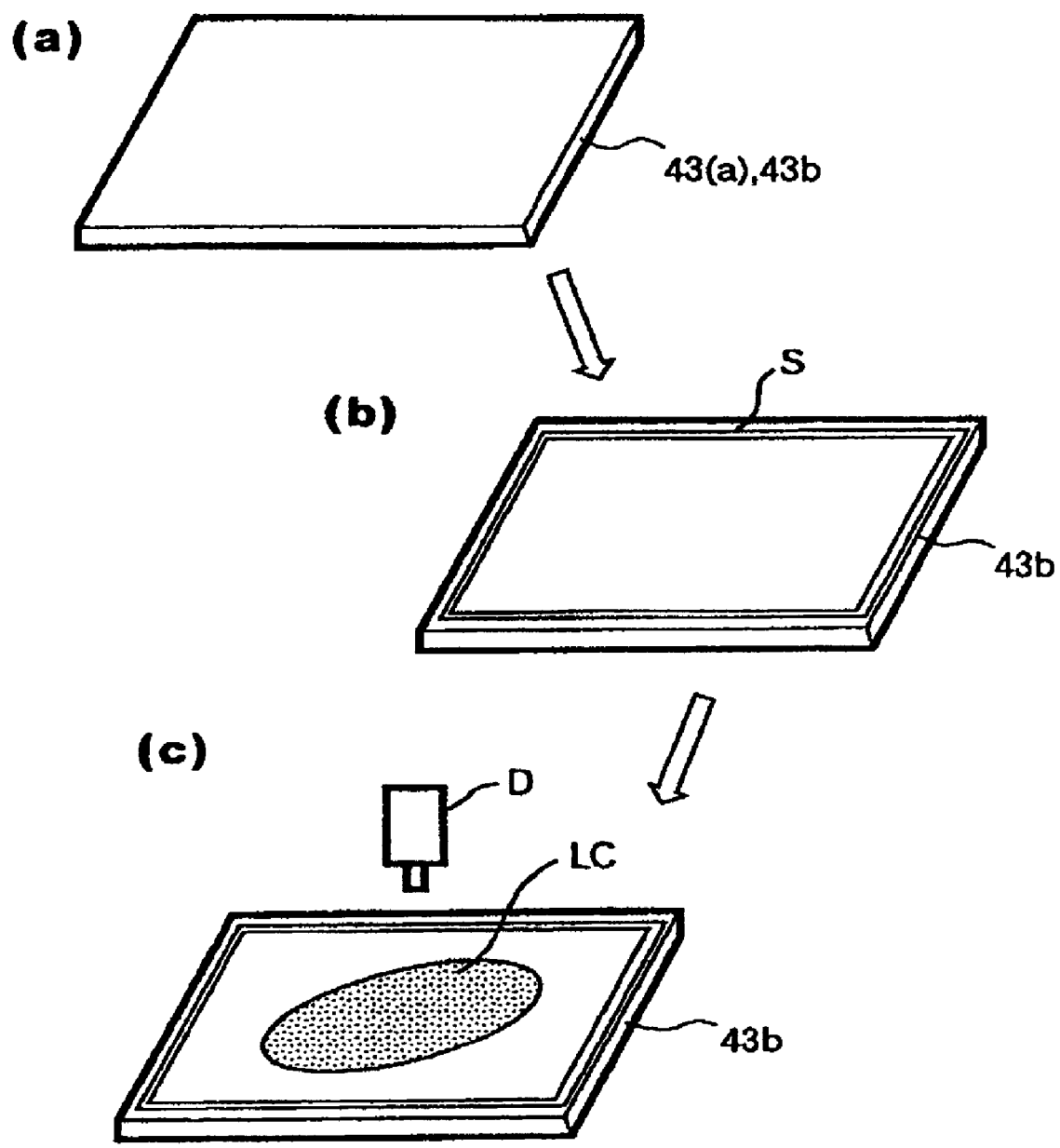
FIG. 3 is a view schematically showing the manufacturing process of the liquid crystal display panel 43 of the embodiment.

As shown in FIGS. 2 to 4, a color filter substrate 43*a* and a TFT array substrate 43*b* are respectively manufactured (S101 and S102 in FIG. 2, and FIG. 3(*a*)). The manufactured TFT array substrate 43*b* includes a columnar structure (not shown) formed to function as a spacer.

Then, sealant S is applied on the peripheral edge portion of the TFT array substrate 43*b* (S103 in FIG. 2, and FIG. 3(*b*)) in a picture-frame. Or the sealant S can be applied on the color filter substrate as well as on the TFT array substrate. As the sealant S, an ultraviolet curable or thermosetting resin can be used as described above. In the embodiment, the ultraviolet curable resin was used.

After the applying of the sealant S, liquid crystal LC is dropped to a region surrounded with the picture-frame sealant S of the TFT array substrate 43*b* (or the color filter substrate 43*a*) by a dispenser D (S104 in FIG. 2, and FIG. 3(*c*)).

After the liquid crystal LC is dropped onto the TFT array substrate 43*b*, the color filter substrate 43*a* and the TFT array substrate 43*b* are stacked together (S105 in FIG. 2, and FIG. 4(*d*)). Needless to mention, this stacking is carried out while the sealant S and/or the liquid crystal LC is present between both substrates 43*a* and 43*b*. The embodiment has a feature for this stacking process, which will be described later in detail.

After the stacking of the color filter substrate 43*a* and the TFT array substrate 43*b*, the sealant S is subjected to curing (S106 in FIG. 2, and FIG. 4(*e*)). In the embodiment, since the ultraviolet curable resin is used for the sealant S, the stacked body of the color filter substrate 43*a* and the TFT array substrate 43*b* is exposed to ultraviolet radiation from an ultraviolet irradiation lamp UV.

In the above manufacturing process, the step of applying the sealant S on the TFT array substrate 43*b* (S103), the step of dropping the liquid crystal LC onto the TFT array substrate 43*b* (S104) and the step of curing the sealant S by the ultraviolet radiation irradiation (S106) are carried out in the atmosphere. However, the step of stacking the color filter substrate 43*a* and the TFT array substrate 43*b* (S105) is carried out in the vacuum chamber for the purpose of preventing bubble from remaining in the liquid crystal LC layer.

Figure 5:
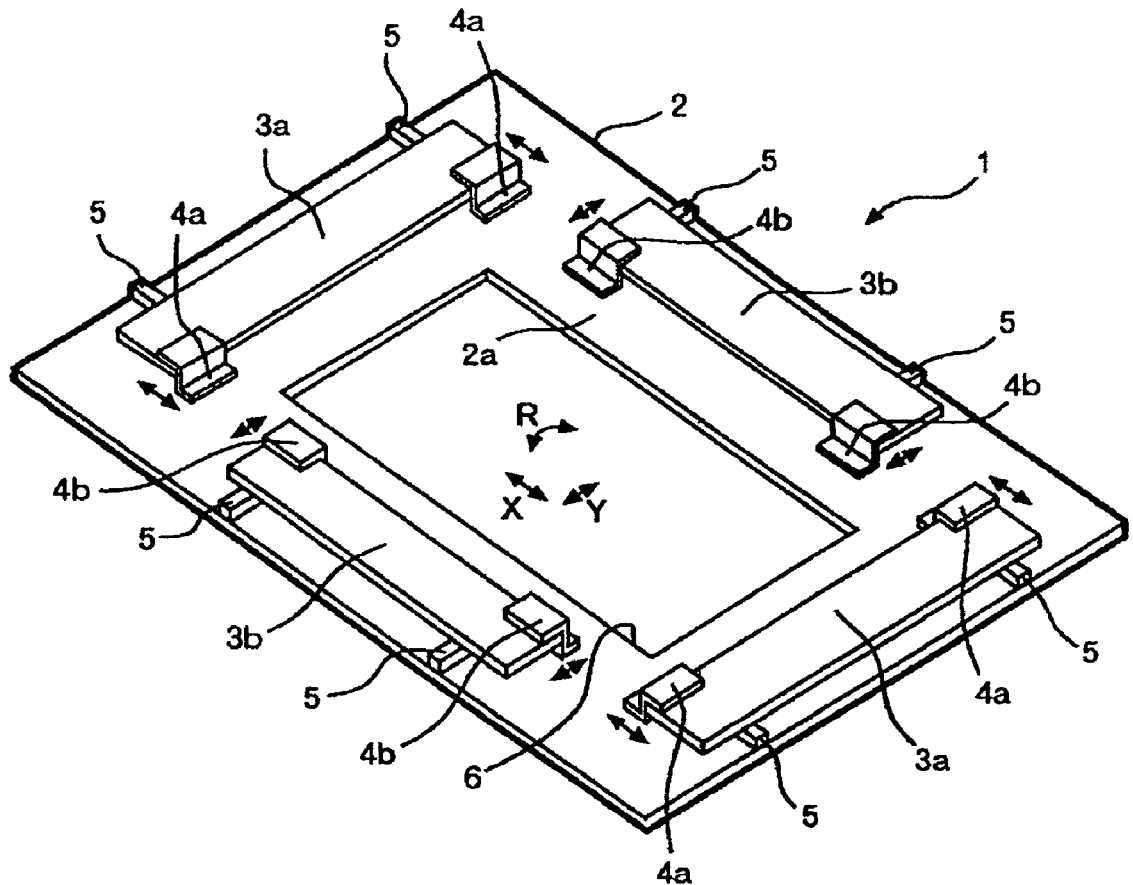
FIG. 5 is a perspective view showing a constitution of a glass substrate supporting device 1 of the embodiment.
Figure 14:
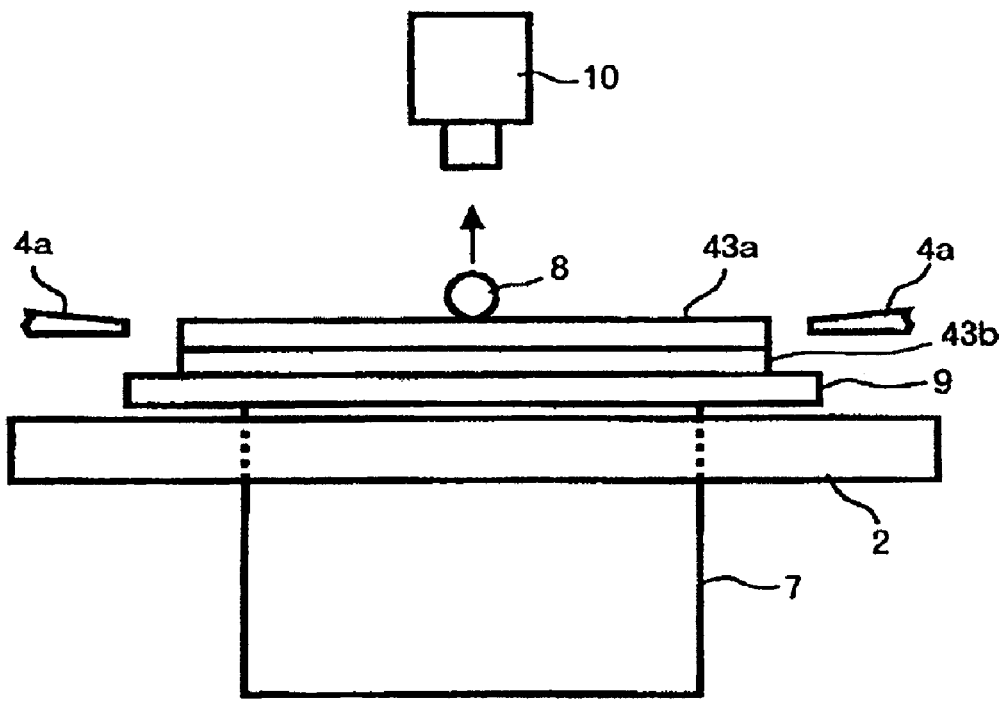
FIG. 14 is a view showing the process of stacking the color filter substrate 43a and the TFT array substrate 43b, specifically showing the state that holding of the supporting nail 4a is released after the holding of the supporting nail 4b is released.
Figure 15:
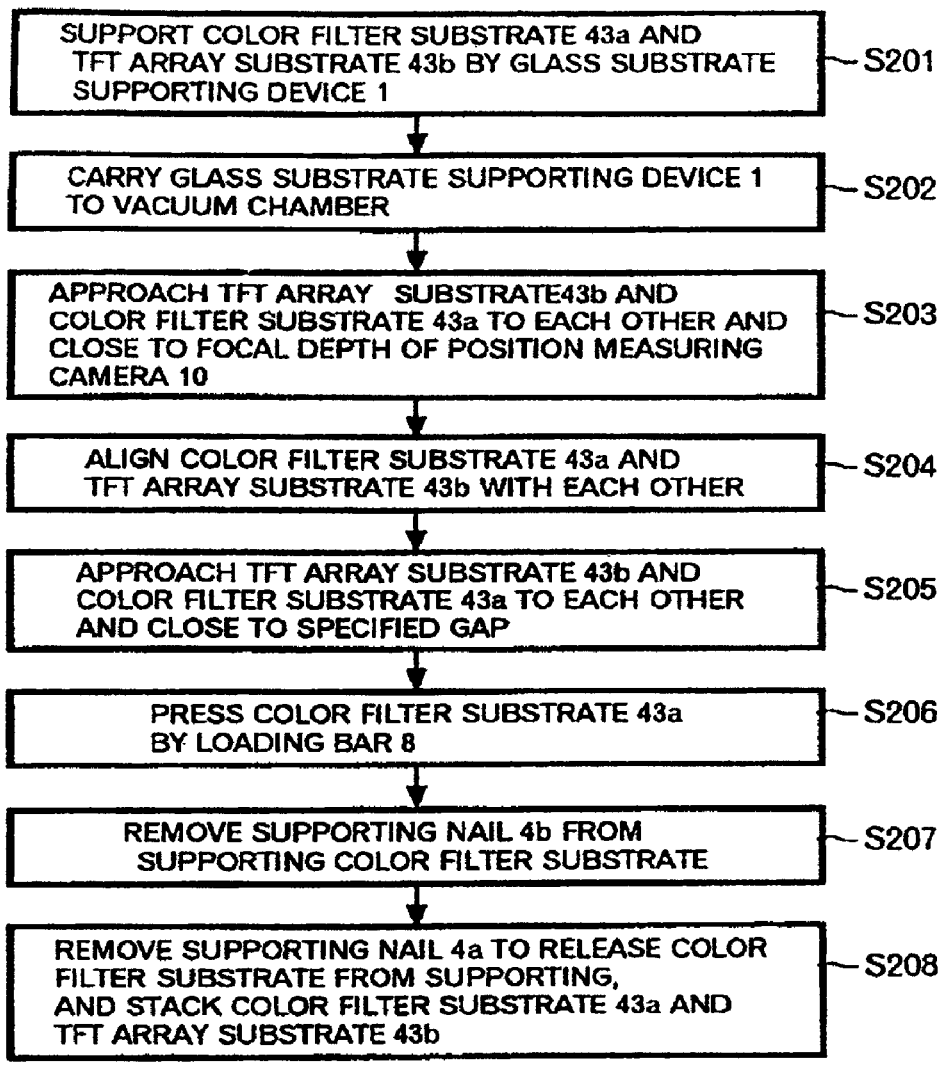
FIG. 15 is a flowchart showing the process of stacking the color filter substrate 43a and the TFT array substrate 43b.

Next, the process of stacking the color filter substrate 43*a* and the TFT array substrate 43*b* will be described in detail by referring to FIGS. 5 to 15. FIG. 5 is a perspective view showing the glass substrate supporting device 1 as a main constituting element of the stacking apparatus of the embodiment; each of FIGS. 6 to 14 shows a side view schematically showing the stacking process of the color filter substrate 43*a* and the TFT array substrate 43*b* carried out by using the glass substrate supporting device 1; and FIG. 15 is a flowchart showing the stacking process of the color filter substrate 43*a* and the TFT array substrate 43*b*.

As shown in FIG. 5, the glass substrate supporting device 1 includes a platform 2 having a rectangular mounting surface 2*a*. An opening window 6 is formed in the center of the platform 2. A later described elevation stage 7 ascends/descends in the opening window 6.

A rail 5 is provided on the platform 2, and sliding plates 3*a* and 3*b* are installed to be movable backward and forward along the rail 5. The sliding plate 3*a* is movable backward and forward along the long side of the platform 2 and in parallel with the mounting surface 2*a*. The sliding plate 3*b* is also movable backward and forward along the short side of the platform 2 and in parallel with the mounting surface 2*a*. No forward/backward moving means is shown, but widely known the means or a driving mechanism such as a motor or the like can be used. The sliding plates 3*a* and 3*b* are movable backward and forward independently of each other, and capable of properly dealing with the supporting of the color filter substrates 43*a* of different sizes.

Figure 6:
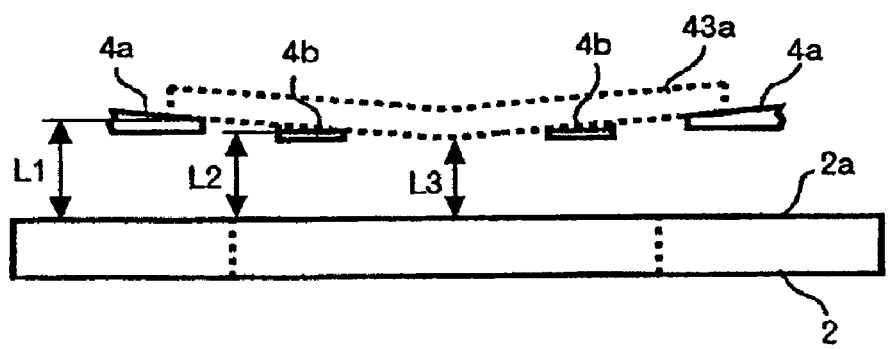
FIG. 6 is a view illustrating perpendicular positions of supporting nails 4a and 4b of the glass substrate supporting device 1 of the embodiment.

Supporting nails 4*a* and 4*b* are attached to both ends of each of the sliding plates 3*a* and 3*b*. The filter substrate 43*a* is held by these supporting nails 4*a* and 4*b*. The supporting nails 4*a* and 4*b* can be moved together with the sliding plates 3*a* and 3*b* with respect to a direction parallel to the mounting surface 2*a*. However, the positions thereof are fixed with respect to a direction perpendicular to the mounting surface 2*a*. A distance from the mounting surface 2*a* to the supporting nail 4*a* is larger than that from the mounting surface 2*a* to the supporting nail 4*b*. In other words, as shown in FIG. 6, suppose that a distance from the mounting surface 2*a* to the supporting nail 4*a* is L1, and a distance from the mounting surface 2*a* to the supporting nail 4*b* is L2, a relation of L1>L2 is established. This means that the supporting nail 4*b* supports the color filter substrate 43*a* in a position lower by a specified distance from the supporting nail 4*a*.

When the color filter substrate 43*a* is supported by the supporting nails 4*a* and 4*b*, bending occurs in the color filter substrate 43*a* as shown in FIG. 6. Maximum bending occurs in the center portion of a supporting span by the supporting nail 4*a* of the color filter substrate 43*a*, but the amount of this bending can be controlled to be a constant value by the presence of the supporting nail 4b. This means that a distance L3 between the lowest surface of the color filter substrate 43a where bending occurs and the mounting surface 2a of the platform 2 can be controlled constant. The same holds true even when the size of the color filter substrate 43a is changed.

When stacking together the color filter substrate 43a and the TFT array substrate 43b, firstly, the color filter substrate 43a and the TFT array substrate 43b are set on the glass substrate supporting device 1 (S201 in FIG. 15). This state is shown in FIG. 7.

Figure 7:
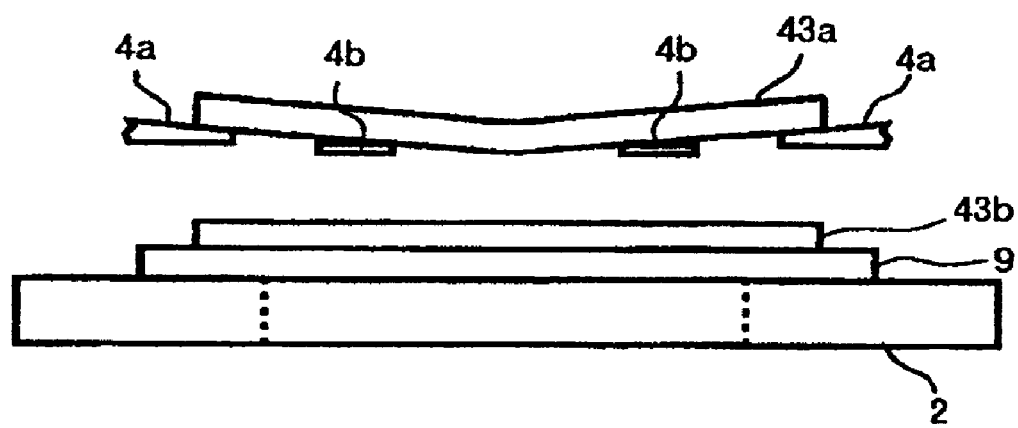
FIG. 7 is a view showing the state of holding a color filter substrate 43a and a TFT array substrate 43b by the glass substrate supporting device 1.

In FIG. 7, a base plate 9 is placed on the mounting surface 2a of the glass substrate supporting device 1, and one of the substrates, which is the TFT array substrate 43a in this case, is mounted thereon. Note that the sealant S and the liquid crystal LC of the TFT array substrate 43a are omitted in the drawing. Moreover, the color filter substrate 43a and the TFT array substrate 43b are both rectangular, and the other substrate held by the supporting nails 4a and 4b, which is the color filter substrate 43a in this case, is bent along the longitudinal direction thereof. The bending amount of the color filter substrate 43a is decided depending on the thickness of the color filter substrate 43a, the supporting span of the substrate supported the supporting nail 4a, or the like. However, as described above, since the supporting nails 4a and 4b are fixed in the position with respect to the direction perpendicular to the mounting surface 2a as shown in FIG. 6, the amount of bending can be controlled to be a constant value even when the color filter substrate 43a becomes larger or smaller in size.

After the setting of the color filter substrate 43a and the TFT array substrate 43b as shown in FIG. 7, the glass substrate supporting device 1 is carried to the vacuum chamber (S202 in FIG. 15). In the vacuum chamber, the stacking of the color filter substrate 43a and the TFT array substrate 43b is put into practice; The execution of the stacking in the vacuum chamber is for the purpose of eliminating bubble getting caught into the liquid crystal LC layer.

Figure 8:
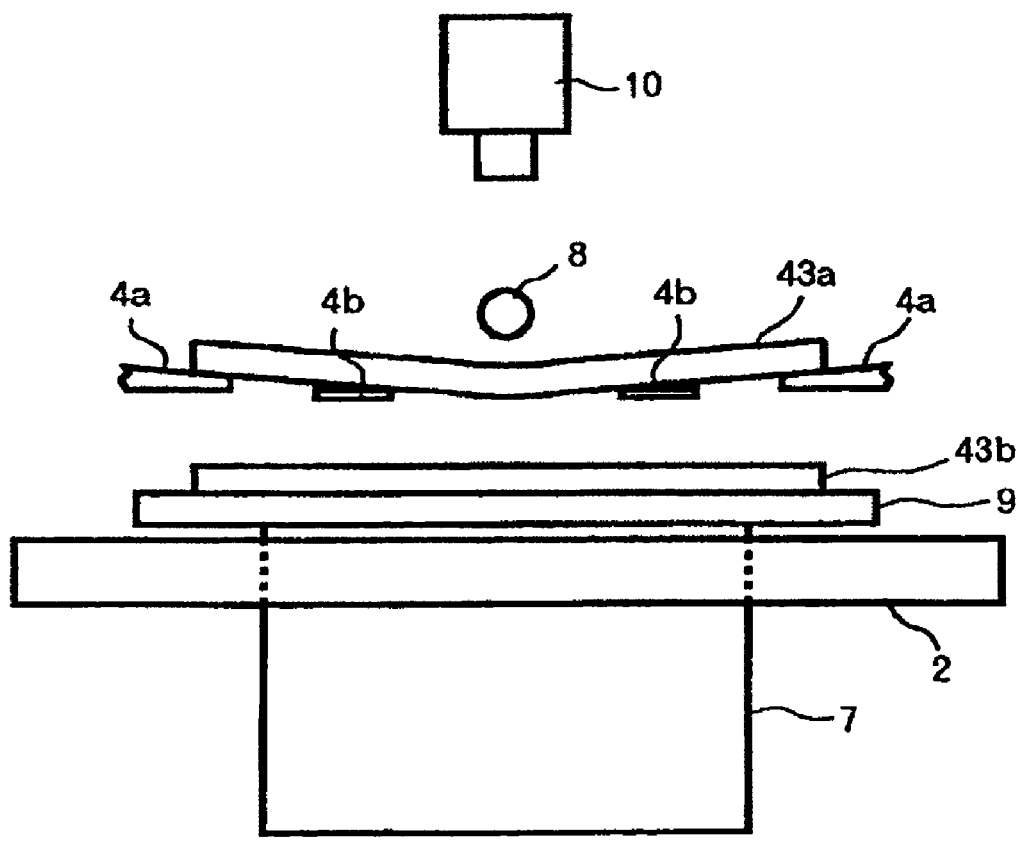
FIG. 8 is a view showing the state of the glass substrate supporting device 1 holding the color filter substrate 43a and the TFT array substrate 43b disposed in a vacuum chamber.

Note that FIG. 8 shows the state of the glass substrate supporting device 1 carried into the vacuum chamber. The vacuum chamber is omitted in the drawing. In the vacuum chamber, the elevation stage 7, the loading bar 8 and the position monitoring camera 10 are disposed.

After the setting of the color filter substrate 43a and the TFT array substrate 43b thereon, the glass substrate supporting device 1 is carried to the position of the elevation stage 7 in the vacuum chamber. In addition, the base plate 9 is arranged such that its bottom surface can be brought into contact with the upper surface of the elevation stage 7. The elevation stage 7 is capable of ascending/descending by a not shown driving source and, on the upper surface thereof, a mechanism is provided to enable motion of X and Y directions indicated by arrows in FIG. 5. Similarly, turning motion can be made in a horizontal or in-plane direction indicated by an arrow R in FIG. 5.

Figure 9:
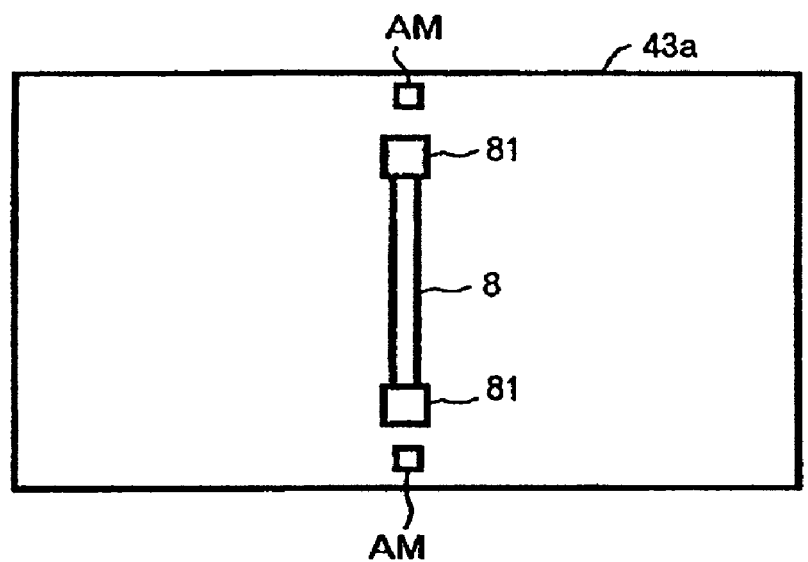

The loading bar 8 is located above the color filter substrate 43a. This loading bar 8 can be brought into contact with/separated from the color filter substrate 43a by a not-shown elevating means. FIG. 9 shows the plane view of the loading bar 8 corresponding to the color filter substrate 43a. The loading bar 8 presses the color filter substrate 43a by loading portions 81 provided in both end portions of the loading bar 8.

The position monitoring camera 10 is installed to verify the stacking positions of the color filter substrate 43a and the TFT array substrate 43b. Specifically, the color filter substrate 43a and the TFT array substrate 43a include alignment marks AM formed in positions as shown in FIG. 9. Coincidence between these alignment marks AM is observed by the position monitoring camera 10 located above.

Figure 10:
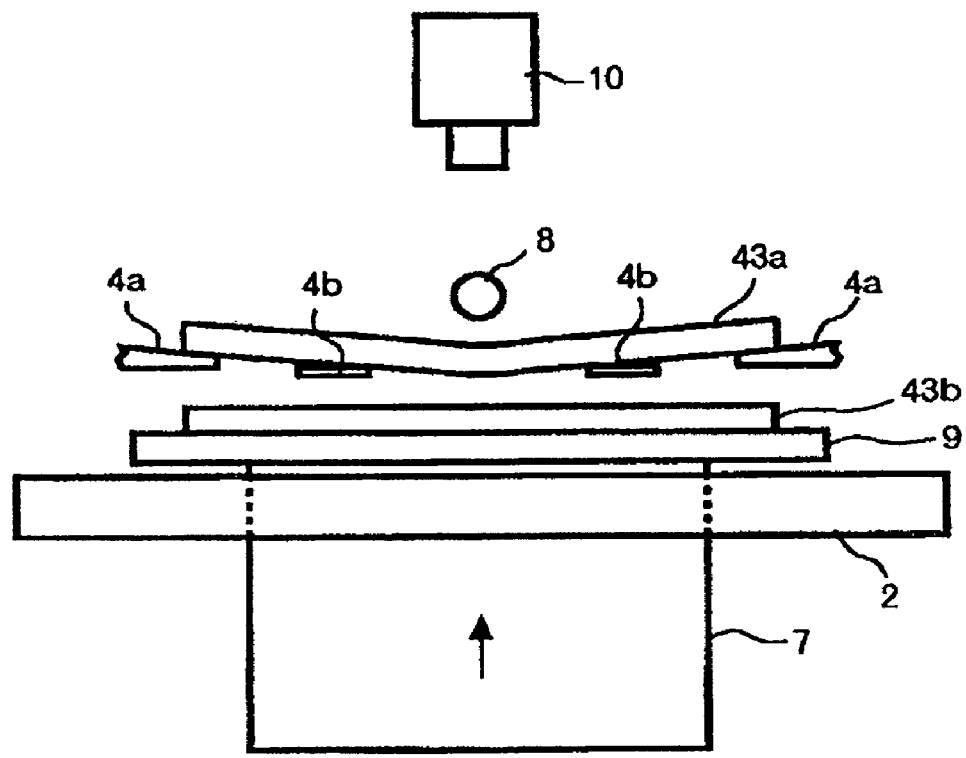
FIG. 10 is a view showing a process of stacking the color filter substrate 43a and the TFT array substrate 43b, specifically showing the state of a rising start of an elevation stage 7.

After the arrangement of the glass substrate supporting device 1 in a specified position in the vacuum chamber, the vacuum chamber is evacuated. After reaching to the specified vacuum pressure, the elevation stage 7 is elevated up as shown in FIG. 10. Along with the elevating the elevation stage 7, the base plate 9 and the TFT array substrate 43b are approached to close to the color filter substrate 43a.

At a point of time when the TFT array substrate 43a is approached to be within the focal depth of the position monitoring camera 10, the elevating motion of the elevation stage 7 is temporarily stopped (S203 in FIG. 15). By properly moving the upper surface of the elevation stage 7 in the above-described directions of X, Y and R with monitoring the alignment marks AM by the position monitoring camera 10, the color filter substrate 43a and the TFT array substrate 43b are aligned with each other (S204 in FIG. 15).

Figure 11:
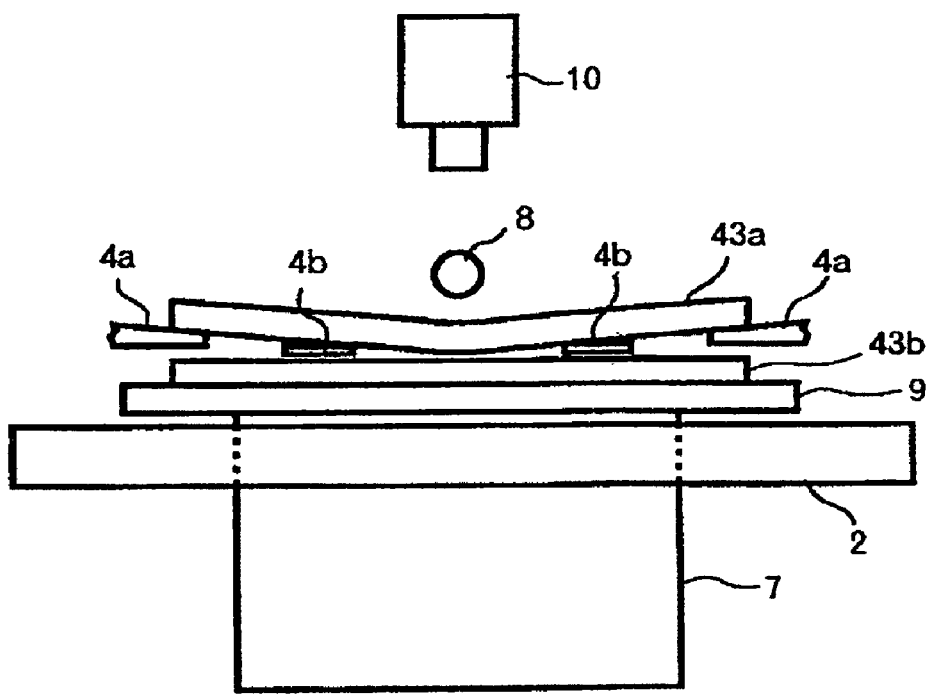
FIG. 11 is a view showing the process of stacking the color filter substrate 43a and the TFT array substrate 43b, specifically showing the completion of the rising of the elevation stage 7 to a specified position.

After achieving the alignment between the color filter substrate 43a and the TFT array substrate 43b, both substrates 43a and 43b are further approached to close each other by the elevation stage 7. As shown in FIG. 11, when a distance or a gap between the TFT array substrate 43b and the color filter substrate 43a reaches a specified value, the movement of the elevation stage 7 is stopped (S205 in FIG. 15).

Figure 12:
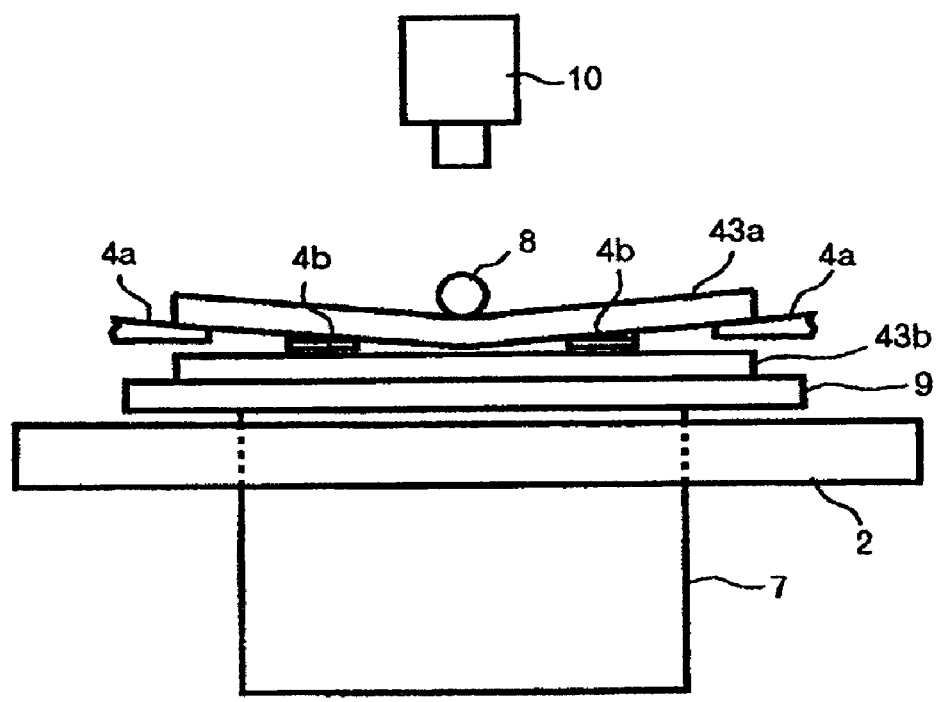
FIG. 12 is a view showing the process of stacking the color filter substrate 43a and the TFT array substrate 43b, specifically showing the state of the loading bar 8 lowered to a position for contact with the color filter substrate 43a after the rising completion of the elevation stage 7.

After the distance between the TFT array substrate 43b and the color filter substrate 43a has reached the specified value and the movement of the elevation stage 7 has been stopped, as shown in FIG. 12, the loading bar 8 is lowered. The loading bar 8 presses the color filter substrate 43a from its upper surface (S206 in FIG. 15). Accordingly, the perpendicular load is applied to the color filter substrate 43a, resulting in the increased bending amount of the color filter substrate 43a. In addition, the distance is accordingly narrowed between the TFT array substrate 43b and the color filter substrate 43a. The lowering amount of the loading bar 8 must be controlled such that the narrowed distance can be equal to the cell gap required of the liquid crystal display panel 43.

Herein, as described above, the distance L3 between the lowest surface of the color filter substrate 43a and the mounting surface 2a of the glass substrate supporting device 1 is controlled constant. Thus, in order to set the distance between the TFT array substrate 43b and the color filter substrate 43a equal to the specified value, it is only necessary to raise up the TFT array substrate 43b by a certain value with using the mounting surface 2a as a reference. Moreover, the distance L3 is controlled constant irrespective of the size of the color filter substrate 43a. Accordingly, even when the variety of the size of the color filter substrate 43a is adopted, a desired cell gap can be obtained by rasing the TFT array substrate 43b by the certain value with the mounting surface 2a used as the reference.

Figure 13:
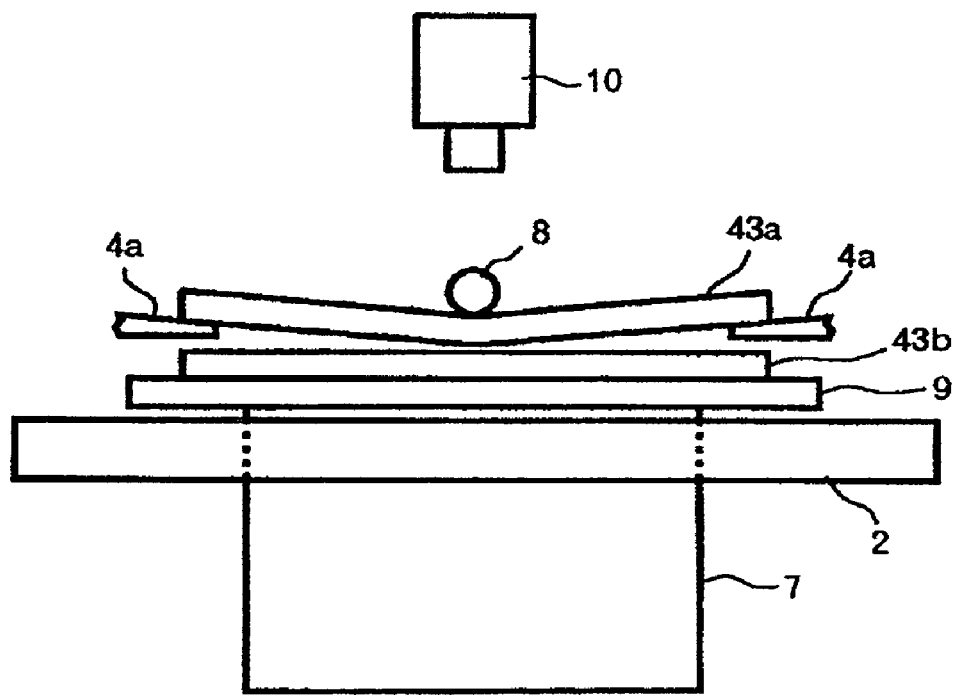
FIG. 13 is a view showing the process of stacking the color filter substrate 43a and the TFT array substrate 43b, specifically showing the state that holding of the supporting nail 4b is released while the color filter substrate 43a is pressed by the loading bar 8.

After the pressing bar 8 is lowered by a specified amount, as shown in FIG. 13, the supporting of the color filter substrate 43a is released by supporting by the supporting nails 4b (S207 in FIG. 15). This releasing of the supporting is carried out by removing out the four supporting nails 4b. With consideration given to the prevention of a displacement or shifting of the color filter substrate 43a, the removal is carried out simultaneously for the four supporting nails 4b at a high speed. After removing the supporting nail 4b, as shown in FIG. 14, the supporting nails 4a are also removed to release the supporting of the color filter substrate 43a (S208 in FIG. 15). This removing the supporting nails 43a is carried out similarly to that for the supporting nails 4b. Since the color filter substrate 43a is pressed by the loading bar 8, the displacement of the color filter substrate 43a can be avoided.

After the supporting of the color filter substrate 43a by the supporting nails 4a and 4b is released, the color filter substrate 43a and the TFT array substrate 43a are stacked together as shown in FIG. 14. In FIG. 14, the distance between the color filer substrate 43a and the TFT array substrate 43b is omitted from the drawing.

After the completion of the stacking of the color filter substrate 43a and the TFT array substrate 43b, the elevation stage 7 is lowered, and then the atmospheric pressure is restored inside the vacuum chamber. The color filter substrate 43a and the TFT array substrate 43b that have been stacked are carried together with the glass substrate supporting device 1 from the vacuum chamber. Then, by exposing the stacked substrates to ultraviolet radiation, the ultraviolet curable resin that has not been cured is subjected to curing.

The inventors made an experiment to verify how much a difference in the displacement of the color filter substrate 43a was affected by with or without of the pressing of the loading bar 8 when the supporting nails 4a and 4b were pulled out to be removed. For the experiment, the color filter substrate 43a and the TFT array substrate 43a having sizes of 15 inches diagonal were used. As a result, when the color filter substrate 43a was not pressed by the loading bar 8, the displacement of about 1 to 2 mm was observed. On the other hand, when the color filter substrate 43a was pressed by the loading bar 8, the displacement was limited to only about 2 micrometers. Thus, the conspicuous advantage of the loading bar 8 for the prevention of the displacement was verified.

There is no particular limitation placed on the material of the loading bar 8. For the prevention of the displacement by pressing the color filter substrate 43a, an elastic material such as rubber or the like is desirable. However, when the color filter substrate 43a is pressed; strong adhesion more than necessary thereto must be avoided. Thus, to prevent tight adhesion, a rubber material having a dimple treated surface, for example, silicon rubber, should preferably be used. It is not necessary to make the entire loading bar 8 of rubber, and for example a main body may be made of stainless steel while only the loading portion 81 may be made of rubber.

According to the result of experiments, the pressing load of the color filter substrate 43a by the loading bar 8 should preferably be large within the range of giving no damage to the color filter substrate 43a. The experiment was performed using two kinds of specific pressing loads of 5 kgf (49N) and 6 kgf (58.8N). A good result was obtained, where an absolute value and variance of a positional shifting were both smaller for 6 kgf (58.8N) than those of 5 kgf (49N).

Figure 16:
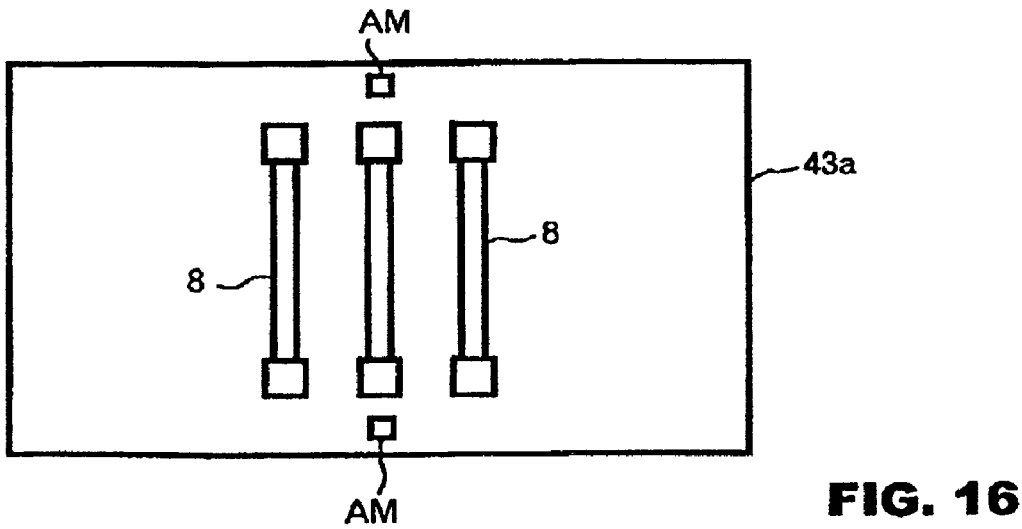
FIG. 16 is a plan view showing an arrangement example of the loading bar 8.

In the embodiment, the number of loading bars 8 is one as shown in FIG. 9. However, more loading bars 8 can be added as shown in FIG. 16. In this way, a displacement can be further suppressed. A pressing position by the loading bars 8 should preferably be set based on a load balance when the supporting nails 4a are pulled out. For example, as illustrated in FIG. 9, the center portion of the supporting span of the color filter substrate 43a by the supporting nails 4a are supported. This middle portion is also a position where the amount of bending is maximum. A span between the loading portions 81 of the loading bar 8 is properly set based on the color filter and TFT array substrates 43a and 43b to be processed. However, a larger span is advantageous for preventing the displacement.

According to the embodiment, the supporting nails 4a and 4b are slid into contact with the color filter substrate 43a at a high speed when they are pulled out. Thus, the supporting nails 4a and 4b should preferably be made of materials generating no dust by abrasion. By the experiment, the inventors found that ultrahigh molecular polyethylene was preferable for the supporting nails 4a and 4b as it generated very few dust.

The embodiment of the invention has been described by taking the example of the manufacturing method of the liquid crystal display panel 43. More specifically, the color filter substrate 43a and the TFT array substrate 43b constituting the liquid crystal display panel 43 were provided as the sheets to be processed. However, this is only one example of the present invention. In other words, the specific structure described above with reference to the embodiment places no limitation on the present invention. For example, regarding the supporting nails 4a and 4b, each side of the color filter substrate 43a is supported at two points in the embodiment. However, it may be supported at three or more points, or the supporting width of each of the supporting nails 4a and 4b can be expanded. Moreover, the alignment between the color filter substrate 43a and the TFT array substrate 43b is carried out by the elevation stage 7. Instead, a mechanism for alignment may be provided in the supporting nail 4 side.

Next, a method for realigning or fine aligning the combined substrates is explained in detail.

Figure 17:
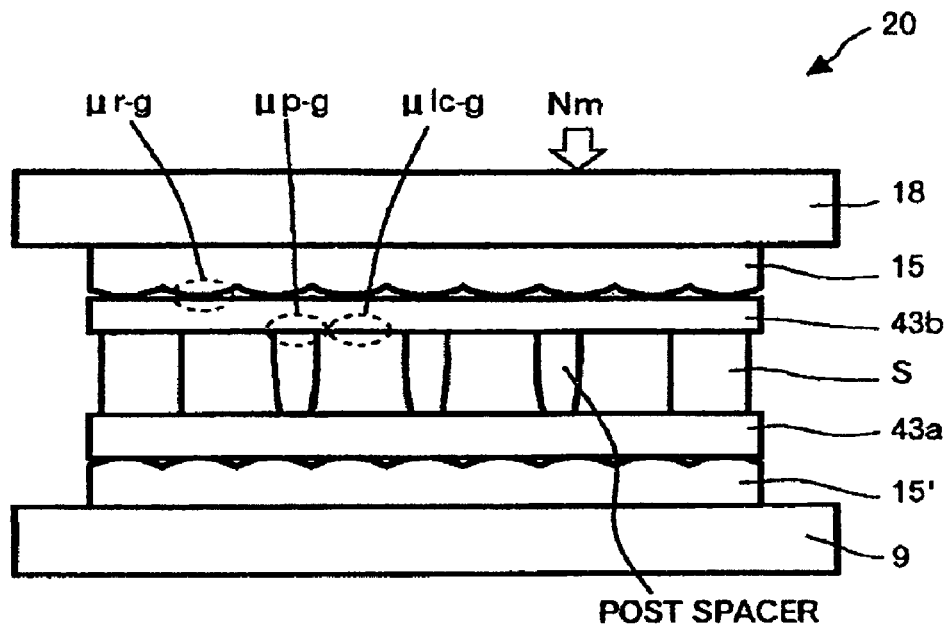
FIG. 17 is an enlarged sectional view showing a step of the fine alignment of the subject invention between color filter substrate and TFT array substrate combined therewith.

In FIG. 17, it shows the enlarged sectional view showing the combination of the color filter substrate 43a and the TFT array substrate 43b in the step of fine alignment. The TFT array substrate 43b is disposed on a base plate 9 and the color filter is laminated thereon. The fine alignment device is disposed on the color filter substrate which is the upper substrate so as the film 15 having high coefficient of static friction is disposed directly on the color filter substrate. The fine alignment device has a loading plate 18 which holds the film 15 and applies the normal force Nm to press the film 15 against the upper substrate. The normal force is caused by the own weight of the loading plate 18 and, optionally, additional loading means such as a pressing machine which is not shown in FIG. 17.

The combined substrates can be aligned finely by horizontally moving the substrates subtly, by each other, with applying the normal force Nm to the film having high coefficient of static friction. Means for horizontally moving the substrates by each other may be the mechanism which can provides a motion of X and Y direction and a turning motion in a in-plane direction, which is attached to the elevation stage 7 as well as to the loading plate. And optionally, another film 15' having high coefficient of static friction may be disposed between the base plate 9 and the TFT array substrate 43b which is the lower substrate.

It is important to that the friction force being generated by pressing the film 15 having high coefficient of static friction $\mu$ r-g against the upper substrate 43a normally is larger than the reaction force between the substrates.

Mainly, the reaction comprises the friction force between the liquid crystal and substrate ($\mu$ lc-g) and the friction force between the tip of the each post spacers and the surface of the color filter substrate faced thereto, generated between the color filter substrate 43a and the TFT array substrate 43b when the fine alignment is carried out.

Actually, the reaction force is about 80-100 kgfs when it is measured with the 13.3 inches substrates in the atmosphere. This reaction force can be varied depending on the size of the substrate, the material and the number of the post spacers, and/or the amount of the normal force applied in the step of the fine alignment. For the worse, it could be a few hundred kgfs or a few 1000 kgfs.

On the other hand, the friction force between the film and the substrate represents the products of the coefficient of friction $\mu$ r-g and the normal force Nm. Preferably the normal force is as small as possible to avoid the damage to the substrates, since the normal force Nm applied to the contact surface between the film and the substrate reaches directly to the laminated substrates. Therefore, in order to reduce the normal force, the coefficient of static friction of the film should be as high as possible. Preferably, the coefficient of the static friction of the film is more than 1.5, more preferably, more than 2.0.

Figure 18:
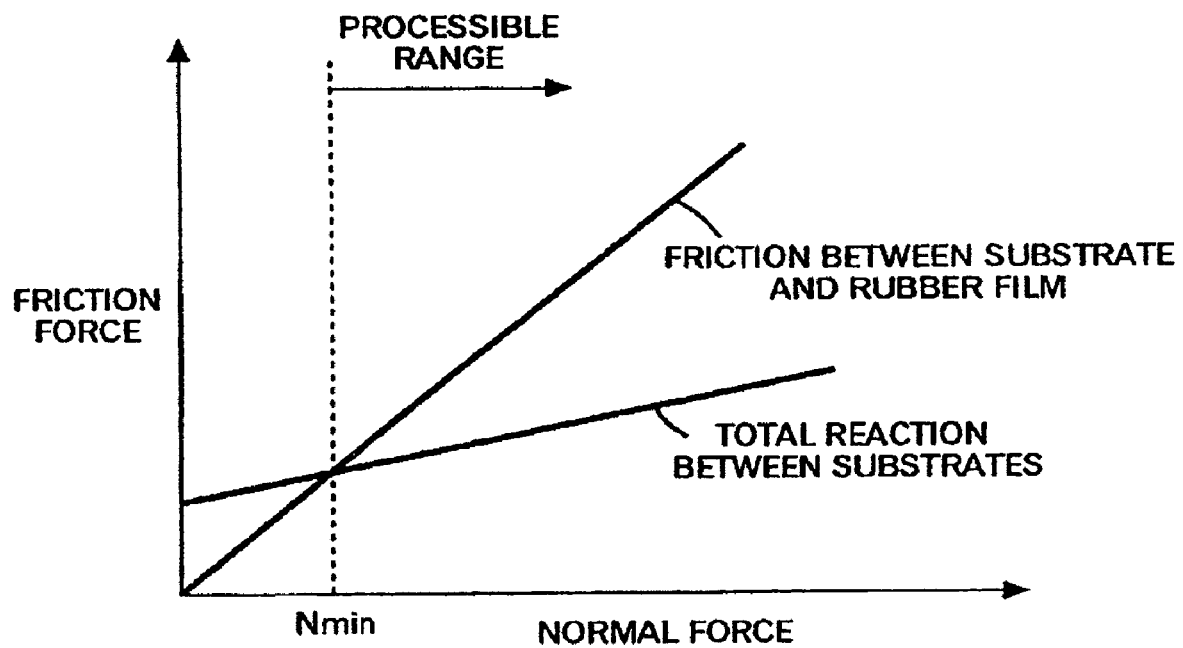
FIG. 18 is a representative diagram showing the relation between the reaction and the friction forces and indicating the range of the normal force Nm to execute the fine alignment of the subject invention.

FIG. 18 shows the representative diagram showing the relation between the reaction and the friction forces and indicating the range of the normal force Nm to execute the fine alignment preferably. The amount of the normal force should be more than the division of the reaction by the coefficient of static friction of the film. And the upper limit of the normal force depends on the rigidity of the device to be realized.

In the preferred embodiment, the fine alignment is carried out before contacting the tip of the each post spacers provided on the TFT array substrate 43*a* with the surface of the color filter substrate 43*b* or the upper substrate. In other words, the fine alignment is carried out during the friction force between the tip of the each post spacers and the surface of the color filter substrate is substantially zero. The reaction in such case, is consisted only by the friction between liquid crystal and the substrate, which is very small; i.e. 10 kgfs or less. Thus, in this case, the normal force can be 5 kgfs or less if the film having the coefficient of the static friction of 2.0 is used.

Figure 19:
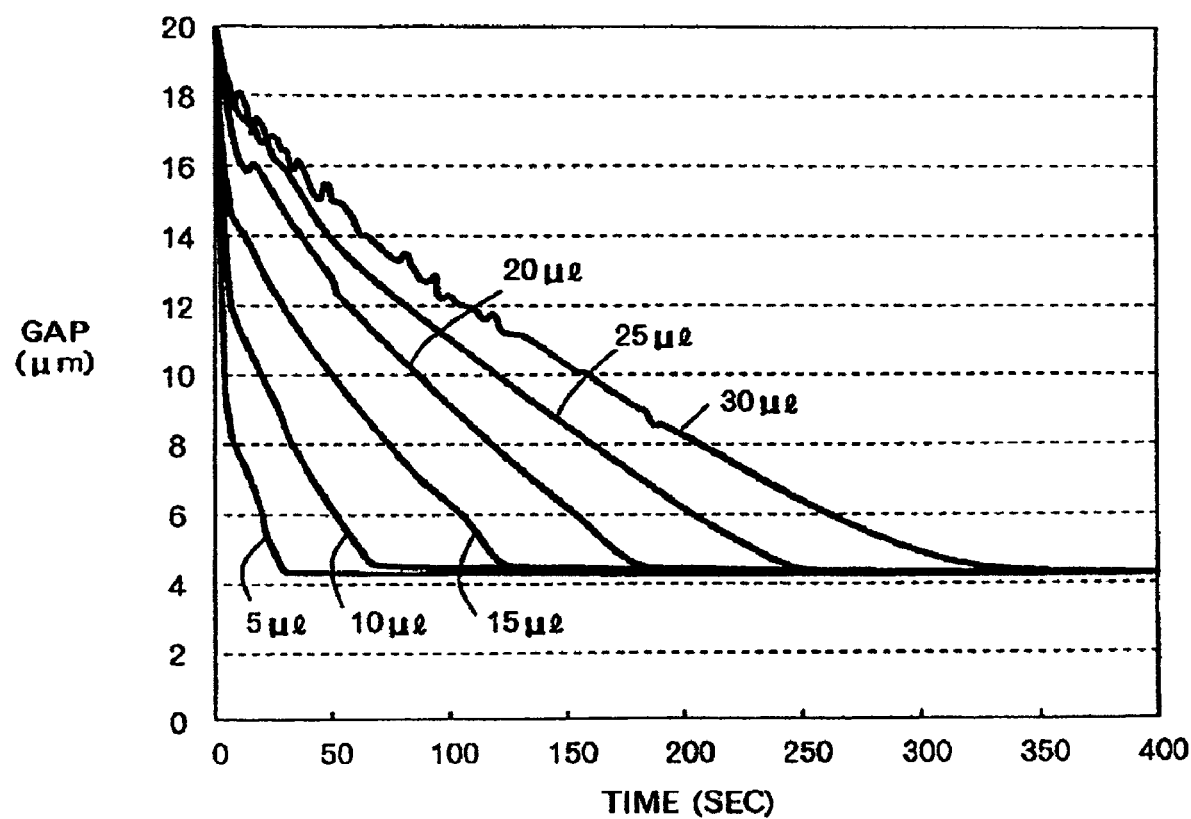
FIG. 19 is a graph showing a change of a gap between substrates by time depending to an amount of a drop of the liquid crystal.

For the 5 inches substrates, it takes about 200 seconds in vacuum (about 0.1 Torr), from releasing the supported state of the color filter substrate 43*b* and laminated on the TFT array substrate 43*a* according to the method of the subject invention, to contacting the tip of the each post spacers with the surface of the upper, color filter substrate. It is sufficiently enough to execute the fine alignment. On the contrary, it takes only 50 minuets in the atmosphere (760 Torr), which is not enough to complete the fine alignment. The time period from releasing the supporting to contacting the tip of the each post spacers with the surface of the upper substrate depends on the amount of a drop of the liquid crystal, but not on the amount of the normal force applied to execute the fine alignment in the practical range. FIG. 19 shows the result of measuring the distance between substrates related to the time from releasing the supporting with variety of the amount of a drop of the liquid crystal. The amount of a drop of the liquid crystal means the amount dropped once in one location, but not the total amount dropped or filled between substrates, wholly. For instance, in order to fill 100 micro letters of the total amount the liquid crystal, it should be four drops if 25 micro letters of the amount of a drop of the liquid crystal, otherwise, it should be ten drops if 10 micro letters. From this result, the amount of a drop of the liquid crystal is preferably 10 micro letters or more, and more preferably, 20 micro letters or more, if the fine alignment is carried out. However, it takes long time to reach the gap finally and it leads decreasing the manufacturing throughput, if excess amount of a drop is employed.

Figure 20:
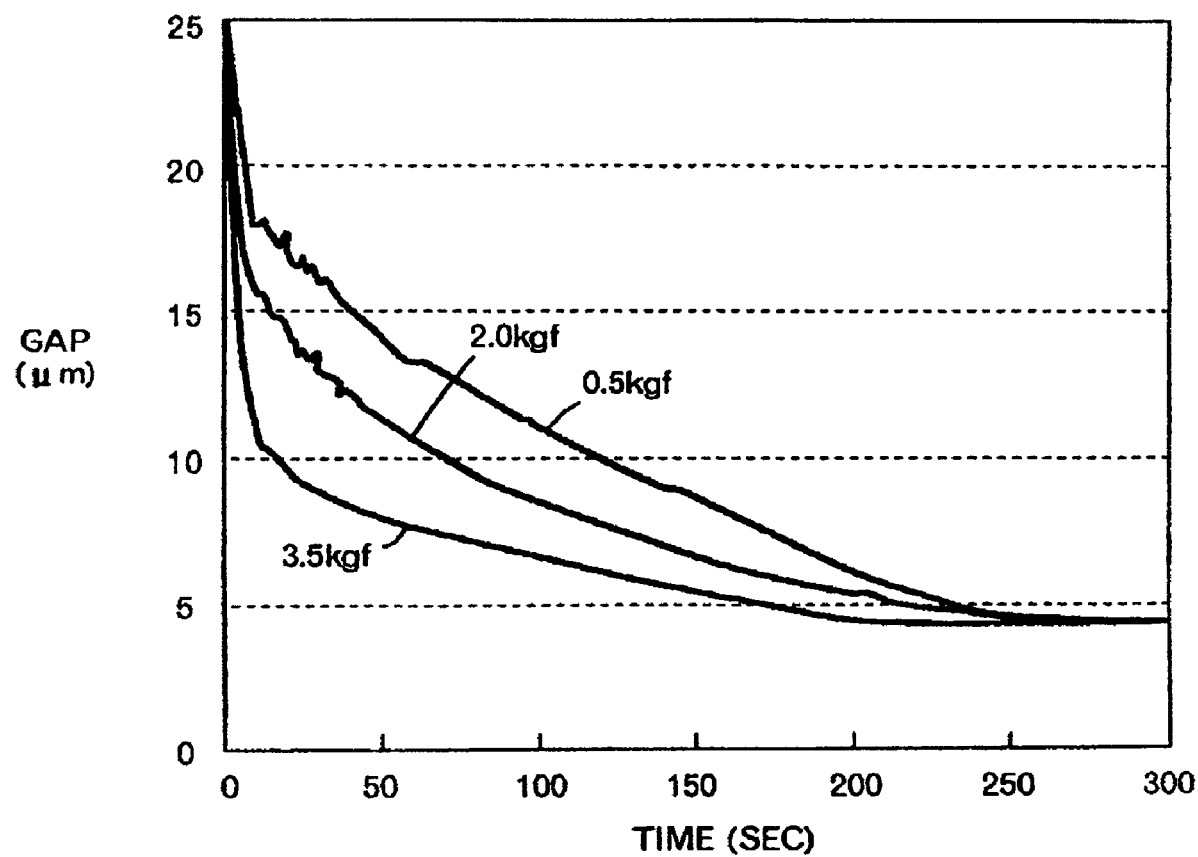
FIG. 20 is a graph showing a change of a gap between substrates by time depending to the applied normal force.

FIG. 20 shows the result of measuring a distance between substrate related to the time from releasing the supporting with variety of the normal force. From the result, in the practical range, the time periods are constant from releasing the supporting to contacting the tip of the each post spacers with the upper substrate and reaching the gap or the distance between substrates finally, without depending on the normal force, although the larger normal force is applied, the faster the substrates close together at first.

The substrates combined and aligned finely each other as mentioned above are almost adhered by the surface tension of the liquid crystal filled in the narrow space between the substrates and by the friction force between the tip of the each post spacers provided on the TFT array substrate and the surface of the color filter substrate, and also the fine alignment of the substrate can be kept with high accuracy. So, the temporal curing to adhere the substrates partially which prevent the displacement horizontally before permanent curing of the sealant, is not necessary, although conventionally executed.

Further, high yield of the product can be achieved, since the liquid crystal panel manufactured by the method of the subject invention, specifically by carrying out the fine alignment in vacuum, dose not trap the air bubble in the liquid crystal layer.

As described above, the present invention provides the method and the apparatus for stacking sheets, which are capable of accurately stacking sheets even in vacuum. Moreover, according to the manufacturing method of a liquid crystal display panel of the present invention, the liquid crystal display panel stacked by employing the dropping method and with high accuracy can be obtained.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for stacking a first rectangular sheet and a second rectangular sheet, comprising the steps of:
    arranging said second sheet bent downward in a projecting shape by using a first pair of supporting nails to support two opposing sides of said second sheet and using a second pair of supporting nails to support a middle portion of said second sheet, wherein the second pair of supporting nails are disposed lower than the first pair of supporting nails;
    bringing said first sheet and said second sheet close to each other to have a predetermined distance;
    applying a perpendicular load to said second sheet; and
    stacking said first sheet and said second sheet by releasing the supporting of said two opposing sides while said perpendicular load is in an applied state.

2. The sheet stacking method according to claim 1, wherein said perpendicular load is applied to a middle portion of a supporting span in said second sheet.

3. The sheet stacking method according to claim 1, wherein said releasing of the supporting comprises the step of removing the respective two sides simultaneously.

4. The sheet stacking method according to claim 1, wherein a bending amount of said second sheet is controlled to be a specified amount.

5. A method for stacking a first rectangular sheet and a second rectangular sheet, comprising the steps of:
    arranging said second sheet bent downward in a projecting shape by using a first pair of supporting nails to support two opposing sides of said second sheet and using a second pair of supporting nails to support a middle portion of said second sheet, wherein the second pair of supporting nails are disposed lower than the first pair of supporting nails;
    elevating said first sheet close to said second sheet to have a predetermined distance;
    applying a perpendicular load to said second sheet; and
    stacking said first sheet and said second sheet by releasing the supporting of said two opposing sides while said perpendicular load is in an applied state.

* * * * *